United States Patent Office 3,795,534

Patented Mar. 5, 1974

3,795,534

MANUFACTURE OF VIDEO DISCS

Robert Michael Mehalso, Trenton, and David Isaac Harris, Kendall Park, N.J., assignors to RCA Corporation No Drawing. Filed Apr. 19, 1972, Ser. No. 245,657
Int. Cl. B44c *1/20, 5/00*
U.S. Cl. 117—101 3 Claims

ABSTRACT OF THE DISCLOSURE

A method of forming a video disc with a uniform groove radius from a disc having grooves of nonuniform radius and depth by applying an excess of photoresist to the grooved disc surface while rotating the disc rapidly only long enough to drive off the excess photoresist and allowing the remaining photoresist to dry while rotating the disc very slowly.

This invention relates to the manufacture of video discs. More particularly, this invention relates to a method of preparing uniform grooves on the surface of a metal disc prior to recording video information thereon.

BACKGROUND OF THE INVENTION

A system for recording and playback of video information has been described by Clemens in a copending application Ser. No. 126,772 filed Mar. 22, 1971. According to this system, video information is recorded by coating the discs with a resist, and selectively exposing the resist in the spiral groove to a scanning electron microscope which converts the video signal information to be recorded to modulating information. After exposure and development of the resist, the video information is recorded on the disc in the form of geometric variations in the bottom of the spiral groove. This disc is then replicated by metal plating, and the metal replica used to stamp or emboss a vinyl disc by methods known in the audio recording art. The vinyl replica is then metallized to make the surface conducting and coated with a dielectric. The stylus employed for playback acts as a second electrode of a capacitor to detect capacitance variations in the groove which correspond to the recorded video information.

In order to reproduce clear images free from background noise, a good and uniform fit between the stylus and the groove is essential. Since the number of grooves in video discs generally vary from about 1000 to about 4000 per inch, it is apparent that the cutting of these grooves represents a step where very close tolerances as to depth and width of the grooves must be maintained. If the radius of the groove is too small, the stylus will contact the groove only at the outer edges and the signal trench will appear too deep, distorting the signal. If the radius of the groove is too large, the stylus will contact the groove only at the center and the signal will also be distorted.

In practice, the cutting of grooves of uniform radius presents a severe manufacturing problem. The spiral grooves are cut by a sharp stylus of a predetermined shape into a lacquer layer on a metal disc. As cutting is continued, the shape and depth of the groove cut by the stylus varies somewhat due to, for example, vibrations imparted to the stylus by its surroundings, by any changes in the current used to drive the cutting stylus, and by nonuniform wear of the stylus caused by repeated abrasion between the stylus and the lacquer. In addition, any changes in the depth or composition of the lacquer coating will be reflected in the shape and depth of the groove. Thus, a method of forming a very small spiral groove of predetermined depth and uniform radius in a video disc has eluded researchers up to now.

SUMMARY OF THE INVENTION

It is an object of the present invention to provide a process for forming spiral grooves in a metal disc whch are uniform in radius and depth from nonuniform grooves.

It is another object to provide a process for forming uniform spiral grooves in a metal disc having a predetermined contour in a rapid and simple manner.

Further objects will be apparent from the following detailed description thereof.

We have discovered that a nonunform spiral groove cut into a metal disc can be coated with photoresist and by proper choice of the speed of rotation of the disc and the viscosity of the photoresist solution, uniform grooves of predetermined depth and contour can be formed.

DETAILED DESCRIPTION OF THE INVENTION

According to the present method, nickel recording masters are prepared according to the mehtod described in the application of Clemens referred to hereinabove as follows:

A basic disc of a one-half inch thick aluminum blank 14" in diameter is machined flat and a protective coating is applied to the aluminum surface to prevent chemical attack of the aluminum base prior to applying a lacquer coat to the disc. A uniform layer approximately 0.005 inch thick of a recording lacquer is applied to the disc surface. After drying, the lacquer is machined flat to within 0.0002 inch and a spiral groove is cut into the lacquer using a sapphire cutting tool. The depth of the cut is about 0.0005 inch and the spiral groove pitch is generally from about 1000 to about 4000 grooves per inch.

The surface of the lacquer coating is then sensitized with a solution of stannous chloride and a conductive coating, as of silver, is chemically deposited on the lacquer. A nickel layer is then electroplated to the silver coating to a depth of 0.010 inch to form a nickel replica of the lacquered layer.

The nickel replica is then cemented to a second aluminum base disc which is prepared in a manner similar to the first base disc. An epoxide is spread over the machined surface of the second aluminum disc, which is then pressed onto the electroplated nickel replica to bind the nickel replica to the second aluminum disc. After the epoxide has partially cured, the sandwich structure is separated at the interface between the lacquer coating on the first aluminum disc and the chemically deposited silver coating.

The second base disc contains grooves which are negative replicas of the original lacquered grooves. The silver layer on this disc is passivated with a solution of potassium dichromate and a second nickel layer, 0.010 inch deep is electroplated onto the silver coating to form a nickel recording master which is now a positive replica of the original lacquer groove.

A third aluminum disc prepared in the same manner as the first and second discs is pressed to the nickel recording master on the side opposite the grooves with an epoxide coating. When the epoxide has partially cured, this structure is separated so that the nickel recording master is separated from the nickel replica at the interface between the nickel master and the passivated silver coating.

The nickel recording master has positive grooves on its surface, which is now employed as the master for recording video information. This disc has spiral grooves of nonuniform contour and radius.

According to the present invention, this disc is now mounted on a variable speed turntable and a solution of photoresist applied in conventional manner to the grooved surface of the disc. As the photoresist is being applied, the disc is rotated rapidly at a speed of from about 100 to about 2000 r.p.m., preferably at about 100 to 300 r.p.m. The centrifugal forces generated by the rotation act to drive the excess photoresist from the disc surface. The amount of photoresist remaining on the surface and in the grooves of the disc depends upon the viscosity of the photoresist solution and the speed of rotation of the disc.

As soon as the excess photoresist has been driven off, which generally takes up to about one minute depending on the speed of rotation, the turntable is then slowed to from about 2 to 10 r.p.m. until the photoresist coating has dried, which generally takes from about 10 to 30 minutes longer.

This two-step process is essential in order to form uniform shallow grooves in the disc. When the disc is rotated at a constant high speed, the photoresist coats the walls of the groove to a substantially uniform thickness, thereby essentially following the nonuniform contour which was originally cut. When the disc is rotated at a constant slow speed, too much photoresist remains on the disc, filling up the grooves. By proper choice and variation of the viscosity of the photoresist and the speed of rotation of the disc during application and drying of the photoresist, the photoresist coats the walls of the spiral groove unevenly, but forms a uniformly shaped groove suitable for video recordings.

The photoresists which can be employed in the present process are conventional and several photoresist solutions are available commercially. These vary with respect to viscosity and solids content and can be either of the positive or negative type. The viscosity and solids content of the solution can be varied further as desired by dilution with conventional thinners, as will be known to one skilled in the art. Suitable photoresists for use in the present process have a viscosity of from 0.1 to 200 cps., preferably from 1 to 10 cps.

The invention will be further illustrated by the following examples, but it is to be understood that the invention is not meant to be limited to the details described therein.

Example I

Part A: A 14-inch diameter aluminum disc (A) with a spiral groove thereon containing about 1000 grooves per inch, cut with a 60° angle stylus to a depth of about 6.4 microns, was mounted on a variable speed turntable and rotated at a speed of about 300 r.p.m., while applying an excess of a photoresist solution, commercially available from Shipley Company as AZ 1350 Lot 13067, containing 19.5% by weight of solids, having a viscosity of 4.5 to 4.6 cps. and a specific gravity of 1.0 to 1.01. Rotation was continued for one minute at 300 r.p.m. when the rotation was slowed to about 5 r.p.m. and maintained at that speed for about 30 minutes.

Part B: Application of the same photoresist to a similar disc (B) was made in the same manner, except rotation at 300 r.p.m. was continued for 30 minutes.

Part C: The groove radius was then measured at several locations on the discs from photomicrographs. Results are shown in the table below where radial location is measured out from the center of the discs, designated A and B.

| | Circumferential location, degrees | Groove radius, microns | |
|---|---|---|---|
| | | A | B |
| Radial location, inches: | | | |
| 3⅛ | 0 | 7 | 6 |
| 4½ | 0 | 7 | 8 |
| 5½ | 0 | 7 | 6 |
| 4½ | 90 | 7 | 7 |
| 4½ | 180 | 7 | 6 |
| 4½ | 270 | 7 | 7 |

It is apparent that the groove radius of the disc A was completely uniform, whereas that of the conventionally prepared disc was not.

Example II

The procedure of Example I was followed except substituting a disc having a spiral groove of 4000 grooves per inch, cut with a stylus having an angle of 120° to a depth of 1.1 microns. The photoresist was diluted 2 to 1 parts by volume with a thinner (KAR commercially available from Kodak Company). The disc was rotated for 30 seconds at 100 r.p.m. and for 30 minutes at 5 r.p.m.

Measurements taken at various points along the coated disc as in Example I showed the grooves had a uniform radius of 7.6 microns.

Example III

The procedure of Example II was followed except the grooves were cut with a stylus having an angle of 90° to a depth of 2.5 microns.

The resultant disc had grooves of a uniform radius of 5.8 microns.

We claim:

1. A method of preparing grooves of uniform radius in a metal disc for recording video information having spiral grooves of nonuniform radius and depth which comprises applying an excess of a photoresist having a viscosity of from about 0.1 to 200 cps. to the grooved surface of said disc while rotating said disc at a speed of from about 100 to about 2000 r.p.m. for a time sufficient to drive off the excess photoresist, reducing the speed of rotation of said disc to from 2 to 10 r.p.m. and continuing to rotate at that speed until the photoresist has dried, said grooved metal disk having at least 1,000 grooves per inch and said grooves having a depth of up to 0.0005 inch.

2. A method according to claim 1 wherein said photoresist has a viscosity of from about 1 to about 10 cps.

3. A method according to claim 1 wherein said disc is rotated at a speed of from about 100 to 300 r.p.m. for a period up to one minute and then at a speed of from 2 to 10 r.p.m. for a period of from 10 to 30 minutes.

References Cited

UNITED STATES PATENTS 2,407,179 9/1946 Savage ............ 117—101
2,923,640 2/1960 Buckingham ...... 117—101 X
1,078,265 11/1913 Edison ............ 117—101
3,687,664 8/1972 Broadbent ........ 117—34 X
3,652,314 3/1972 Castner ........... 117—8 X MURRAY KATZ, Primary Examiner
S. P. BECK, Assistant Examiner U.S. Cl. X.R.

117—34, 64 R; 264—106; 274—42